(12) United States Patent
Kito (10) Patent No.: US 9,133,880 B2
(45) Date of Patent: Sep. 15, 2015

(54) LINEAR MOTION GUIDE UNIT

(71) Applicant: NIPPON THOMPSON CO., LTD., Tokyo (JP)

(72) Inventor: Kunihiko Kito, Gifu-ken (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 14/471,118

(22) Filed: Aug. 28, 2014

(65) Prior Publication Data

US 2015/0071576 A1    Mar. 12, 2015

(30) Foreign Application Priority Data

Sep. 11, 2013   (JP) .................................. 2013-188056

(51) Int. Cl.
*F16C 29/06*  (2006.01)
*F16C 33/66*  (2006.01)

(52) U.S. Cl.
CPC ......... *F16C 33/6648* (2013.01); *F16C 29/0633* (2013.01); *F16C 33/6655* (2013.01)

(58) Field of Classification Search
CPC ...... F16C 29/06; F16C 33/66; F16C 29/0609; F16C 33/6603–33/6655
See application file for complete search history.

(56) References Cited

U.S. PATENT DOCUMENTS

| | | | |
|---|---|---|---|
| 6,257,766 B1* | 7/2001 | Agari | 384/45 |
| 2008/0080795 A1* | 4/2008 | Kuwabara et al. | 384/13 |
| 2008/0159668 A1* | 7/2008 | Wu et al. | 384/13 |
| 2009/0052815 A1* | 2/2009 | Kakei | 384/7 |
| 2010/0002965 A1* | 1/2010 | Kondo | 384/13 |
| 2012/0195535 A1* | 8/2012 | Shibuya et al. | 384/13 |

FOREIGN PATENT DOCUMENTS

| | | | |
|---|---|---|---|
| EP | 950465 A2 * | 10/1999 | |
| JP | 2004036814 A | 2/2004 | |
| JP | 2007100951 A | 4/2007 | |
| JP | 2010014228 A | 1/2010 | |

* cited by examiner

*Primary Examiner* — Thomas R. Hannon
(74) *Attorney, Agent, or Firm* — Browdy and Neimark, PLLC (57) ABSTRACT

A lubricating member is composed of a lubricant reservoir plate of a porous compact and a lubricant-containing member of fibrous material. The lubricating member is packed in an empty space in the end cap to make sure of maintenance-free operation for lubrication over a prolonged period of time. The lubricant reservoir plate is stowed in a recess formed on an outward end surface of the end cap major body and the lubricant-containing member is placed in the space lying deeper than the recess. A packing plate is placed between the lubricant reservoir plate and the lubricant-containing member with making close engagement with an edge defining the recess on the end cap to cover entirely a whole area of the lubricant reservoir plate to seal the lubricant impregnated in the lubricant reservoir plate inside the end cap.

10 Claims, 8 Drawing Sheets

LINEAR MOTION GUIDE UNIT

FIELD OF THE INVENTION

The present invention relates to a linear motion guide unit composed of an elongated guide rail and a slider designed to move on the elongated guide rail relative to the guide rail through more than one rolling element. More especially, the present invention relates to a linear motion guide unit in which the slider has therein a porous compact able to be replenished or resupplied with lubricant.

BACKGROUND OF THE INVENTION

With the conventional linear motion guide units of roller type, lubrication members are installed in the end caps lying at opposite ends in the sliding direction of the slider to apply lubricant around the rolling elements inside the turnaround passages in the end caps, thereby to accomplish maintenance-free operation for lubrication. In Japanese Laid-Open Patent Application No. 2007-100 951 which is a commonly-assigned senior application, for example, there is disclosed a linear motion guide unit having lubricant resupply means in which application of lubricant around the rolling elements is done at the turnaround passage to make the lubrication system simpler than ever in construction, along with maintenance-free for steady and positive lubrication. With the prior linear motion guide unit constructed as stated earlier, the end cap has an opening extending from a recess on the outward end surface to the turnaround passage and a lubricant reservoir plate of porous compact impregnated with lubricant fits into the recess on the outward end surface of the end cap. The lubricant reservoir plate has an applicator nose extending through the opening in the end cap to form at the extremity thereof in part the circular wall of the turnaround passage to expose itself to come into engagement with the rollers rolling through the turnaround passage, thereby making application of lubricant around the rollers.

In another Japanese Laid-Open Patent Application No. 2010-14 228 which is also a commonly-assigned senior application, there is disclosed a linear rolling motion guide unit in which the race or raceway groove of the guide rail may be applied or coated uniformly or evenly with lubricant whether the guide rail is kept at any posture of horizontal, vertical, tilt or upside down. With the linear rolling motion guide unit constructed as stated just earlier, the member body which fits over or conforms to the guide rail has the embedding portion recessed or concaved to accommodate therein the lubricant-impregnated member to apply the lubricant on the race or raceway groove of the guide rail. The embedding portion of the member body fitting over the guide rail has at least a part maintained in position at a level equal or higher than the level of at least a part of one of the races of the guide rail located higher relative to the other races. Thus, it will be said that the prior linear rolling motion guide unit constructed as stated earlier. as having an additional lubricating member supplied with lubricant later on, may continue to apply lubricant on the guide rail while keeping positive engagement with the guide rail whether the guide rail is kept at any posture of horizontal, vertical, tilt or upside down.

Another Japanese Laid-Open Patent Application No. 2004-36 814 discloses a linear motion guide unit having lubricant supplier means which is able to be supplied with lubricant to make it possible to continue to keep steady lubrication for a prolonged interval of time. With the prior linear motion guide unit, the lubricant supplier means is placed to come close to the member to be applied with lubricant and composed of a shell layer of polymer containing lubricant therein and a lubricant retainer layer holding lubricant therein. The shell layer comes into engagement or contact at least in part with the member to be lubricated, and the lubricant retainer layer is made of needle felt that fits into a concave formed inside the shell layer. The needle felt is composed of synthetic resin fibers where grease or lubricant is absorbed so as to be resupplied.

Meanwhile, though the conventional linear motion guide units have been expected to continue application of lubricant around the rolling elements over a prolonged interval of time to realize the maintenance-free working for lubrication, there has been ever developed no lubricant supplier means good enough to continue supplying lubricant around the rolling elements over a prolonged interval of time to realize the maintenance-free working for lubrication. With some prior linear motion guide units, there has been developed the sleeve construction of lubricant supplier means. However, the sleeve construction, as very thin in thickness, becomes too less in volume to keep sufficient amount of lubricant. Thus, there is a fear of poor lubrication such as binding between rolling elements or sticky condition which would be caused by lubrication lack around the rolling elements. Moreover, although there is provided the linear motion guide unit of roller type in which porous compact impregnated with lubricant fits into the end cap and applicator noses extend to expose themselves to the turnaround passages to carry out application of the lubricant around rolling elements from the inside circular surfaces of the turnaround passages while rollers roll across the turnaround passage, the linear motion guide unit constructed as stated just earlier has a major problem that the structure becomes very sophisticated.

With the linear motion guide unit of such type that the lubricating member makes contact with the raceway surface of the guide rail, there is a major challenge that the lubricating member suffers with much frictional resistance because of resupply of lubricant and correspondingly is worn down to gradually change in contact condition, causing poor lubricating condition. When lubricant-containing polymer is selected for the lubricating member, the lubricant-containing polymer is manufactured by the steps of melting the mixture of polyolefin polymer with lubricating material of poly a olefin oil or the like and pouring molten mixture into a desired mould to solidify the molded mixture while cooling under pressure. The lubricant-containing polymer swells because the resinous material itself has absorbed the lubricating material, but shrinks with deformation after the lubricating material has been discharged. As a result, there will be fear of a serious issue that the lubricant-containing polymer suffers more shrinkage than the reinforcing member with the result that the supply of the lubricating agent around the rolling elements is hindered.

SUMMARY OF THE INVENTION

The present invention has for its primary object to overcome the major challenges as stated earlier, and to provide a linear motion guide unit having a lubricating member which is composed of a lubricant reservoir plate of porous compact impregnated with lubricant and a lubricant-containing fibrous member of fibers, felts, nonwoven cloths and so on impregnated with lubricant, the lubricant-containing fibrous member lying close to the lubricant reservoir plate. The lubricating member is impregnated with ample lubricant and stowed into a recess or vacancy inside the end cap to continue applying the lubricant around the rolling elements over a prolonged period of time, thereby realizing maintenance-free operation for lubrication. Moreover, the lubricant reservoir plate has applicator noses extending so as to expose themselves to openings made in circular walls of the turnaround passages which are provided in the end caps lying on opposite ends in the sliding direction of the slider. The applicator noses come into engagement or contact with the rolling elements while traveling through the turnaround passages to make application of lubricant around the rolling elements, thereby carrying out steady application of lubricant around the rolling elements while they roll through the turnaround passages with smoothness.

The present invention is concerned with a linear motion guide unit; comprising an elongated guide rail having widthwise opposed sides each of which has a first raceway surface extending lengthwise of the guide rail, and a slider that fits over or conforms to the elongated guide rail for movement lengthwise of the guide rail through more than one rolling element, the slider including a carriage, end caps, end seals, more than one rolling element and a lubricating member, the carriage having a second raceway surface extending in opposition to the first raceway surface on the guide rail to define a load-carrying race between the first raceway surface and the second raceway surface and a return passage extending in parallel with the load-carrying race, the end caps being fastened on forward and aft end surfaces of the carriage, one to each end surface, and provided with turnaround passages to join together the load-carrying race and the return passage, the end seals being attached on outward end surfaces of the end caps, the rolling element being allowed to roll through a circulating circuit made up of the load-carrying race, the return passage and the turnaround passages, and the lubricating member being impregnated with lubricant and installed in one of the end caps to lubricate the rolling element; and wherein the lubricating member is composed of a lubricant reservoir plate and a lubricant-containing member, the lubricant reservoir plate being impregnated with the lubricant to lubricate the rolling element and installed in a recess lying on an outward end surface of the end cap, and the lubricant-containing member being stowed in an inside space lying deeper than the recess, with kept in close contact with the lubricant reservoir plate to resupply the lubricant to the lubricant reservoir plate.

With the linear motion guide unit constructed as stated just earlier, a packing plate is placed between the lubricant reservoir plate and the lubricant-containing member with making close engagement with an edge defining the recess on the end cap to cover entirely a whole area of the lubricant reservoir plate to seal the lubricant impregnated in the lubricant reservoir plate inside the end cap.

The lubricant reservoir plate is a porous compact impregnated with the lubricant, the porous compact being preserved in shape with pores or cells interconnected with each other and impregnated with the lubricant. More especially, the porous compact is made of a finely powdery particles of ultrahigh molecular weight synthetic resin of polyethylene or polypropylene and has the pores or cells which are open to each other through interstices among synthetic resinous particles after the finely powdery synthetic resin has been compacted under pressure together with the application of heat.

As the lubricant soaked in the pores or cells of the porous compact of the lubricant reservoir plate is consumed, the lubricant held inside the lubricant-containing member moves into the lubricant reservoir plate with capillary action.
As an alternative, the lubricant-containing member is less than the lubricant reservoir plate in absorption rate of lubricant, so that the lubricant held in the lubricant-containing member is allowed moving to the lubricant reservoir plate.

The lubricant reservoir plate is composed of a reservoir portion to fit into the recess lying in an upper middle area of the end cap major body, conjunctive portions integral with widthwise opposite ends of the reservoir portion to fit into sidewise bulged areas of the end cap major body, and applicator noses integral with the conjunctive portions to fit into slits cut in the turnaround passages in the end cap major body to expose tips of the applicator noses to the turnaround passages.

The lubricant-containing member is stowed into compartments defined with reinforcing ribs in the end cap and further the end cap on an upper surface and/or side surfaces thereof has oiling holes open to the lubricant-containing member to resupply the lubricant to the lubricant-containing member through the oiling holes whereby the lubricant is allowed to move from the lubricant-containing member to the lubricant reservoir plate for application of the lubricant around the rolling element. Moreover, the lubricant-containing member is made of lubricant sustainable material of fibrous material including nonwoven cloth, felt, cotton and the like. The lubricant-containing member is packed as much as possible into a space in the end cap, with divided with reinforcing ribs into a plurality of compartments.

ADVANTAGEOUS EFFECTS OF THE INVENTION

With the linear motion guide unit constructed as stated earlier, the end cap has slits cut in the outside circular wall surface of the turnaround passage defined in the end cap, while the applicator nose of the lubricant reservoir plate of porous compact impregnated with the lubricant lying in the concavity of the end cap is exposed itself through the slits to the turnaround passage to come into engagement with the rolling element to make application of lubricant around the rolling element while rolling through the turnaround passage. The lubricant reservoir plate is supplied with lubricant from the lubricant-containing member which is packed in the compartments formed in the end cap. The lubricant-containing member is resupplied with lubricant by means of a lubricant syringe through oiling holes on the wall of the end cap and in doing so lubrication around the rolling element is carried out without interruption. Especially, as the lubricant-containing member is separately placed in many compartments defined with the reinforcing ribs in the end cap, the empty space in the end cap may be available effectively to stow many blocks of the lubricant-containing member to retain a plenty of lubricant. Moreover, as many oiling holes are made on the upper surface and/or side surfaces of the end cap major body, lubricant is resupplied easily into the inside space of the end cap major body through the oiling holes by use of the lubricant syringe through oiling holes on the wall of the end cap to impregnate the lubricant-containing member with much lubricant. As a result, the smooth application of lubricant around the rolling element is carried out to make it possible to lubricate the rolling element for a prolonged period of time.

While the rolling element rolls through the turnaround passage, Lubricant is applied to the rolling element through the slits made in the inside circular surface of the turnaround passage. This lubricating system of the present invention is preferable to realize the maintenance-free for lubrication with no need of the provision of separate lubricating member and the increase of number of parts. Moreover, the rolling element experiences any inertia or centrifugal force while the rolling direction changes from the linear race or return passage to the curved turnaround passage. Thus, the rolling element while rolling through the turnaround passage is suffered to the centrifugal force or linear thrust to come into engagement with the circular surface of the turnaround passage whereby lubricant is securely applied to the rolling element while rolling through the turnaround passage. With the linear motion guide unit constructed as stated earlier, the rolling element is applied with lubricant while rolling through the turnaround passage to realize maintenance-free lubrication for the rolling element. According to the present invention, there is no need of enlargement in diameter of the hole or opening to add parts or components for lubrication as in the conventional art. This means the linear motion guide unit is kept safer than ever in stiffness or rigidity against external load.

DETAILED DESCRIPTION OF THE PREFERRED EMBODIMENTS

The linear motion guide unit of the present invention is adapted for use in any relatively sliding components in machinery as diverse as semiconductor fabricating equipment, precision machines, measurement/inspection instruments, medical instruments, robotic machines, various assembling machines, micromachines, and so on. Especially, the present invention is intended to develop the linear motion guide unit in which the lubricating member is resupplied with lubricant to continue application of lubricant around the rolling elements over a prolonged interval of time. A preferred embodiment of the linear motion guide unit constructed according to the present invention will be described in detail by reference to the drawings.

Figure 1:
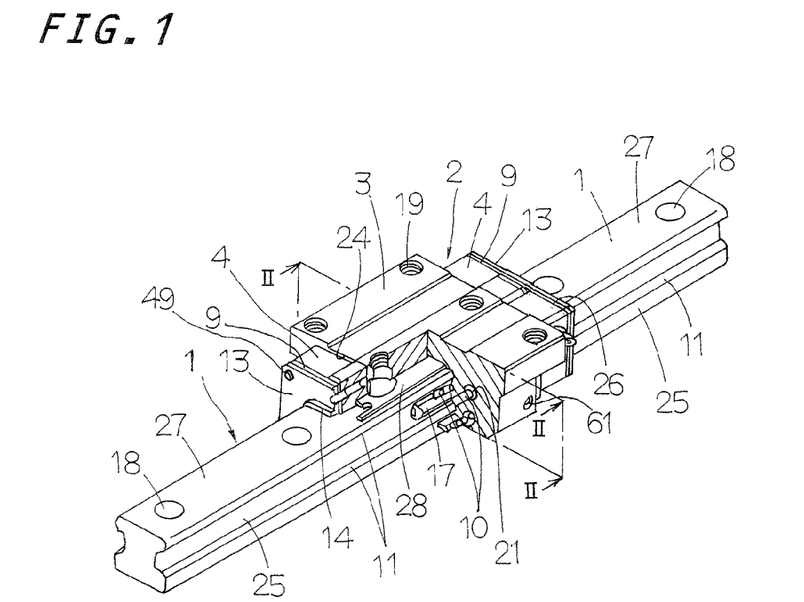
FIG. 1 is a fragmentary and partially cutaway view in perspective showing a preferred embodiment of a linear motion guide unit according to the present invention.
Figure 2:
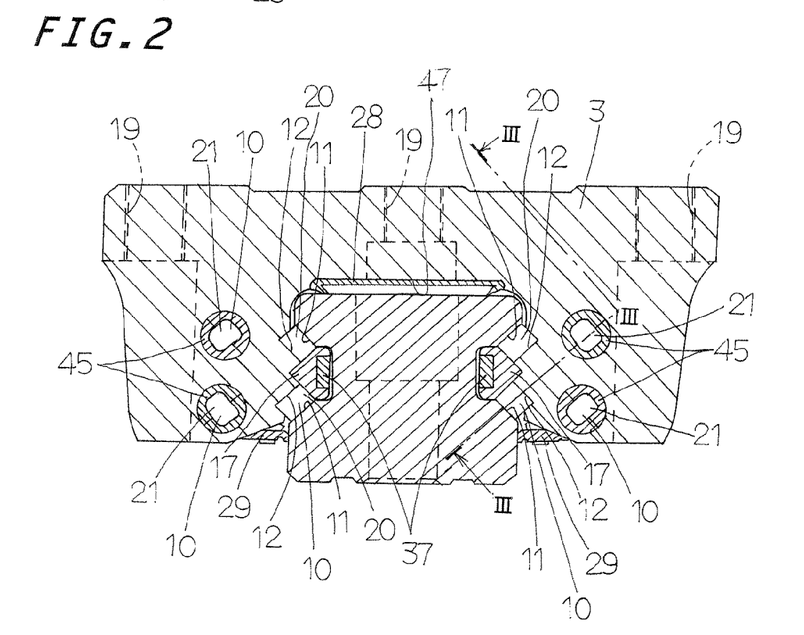
FIG. 2 is a view in transverse section of the linear motion guide unit of FIG. 1, the view being taken on the planes of line II-II of FIG. 1.
Figure 3:
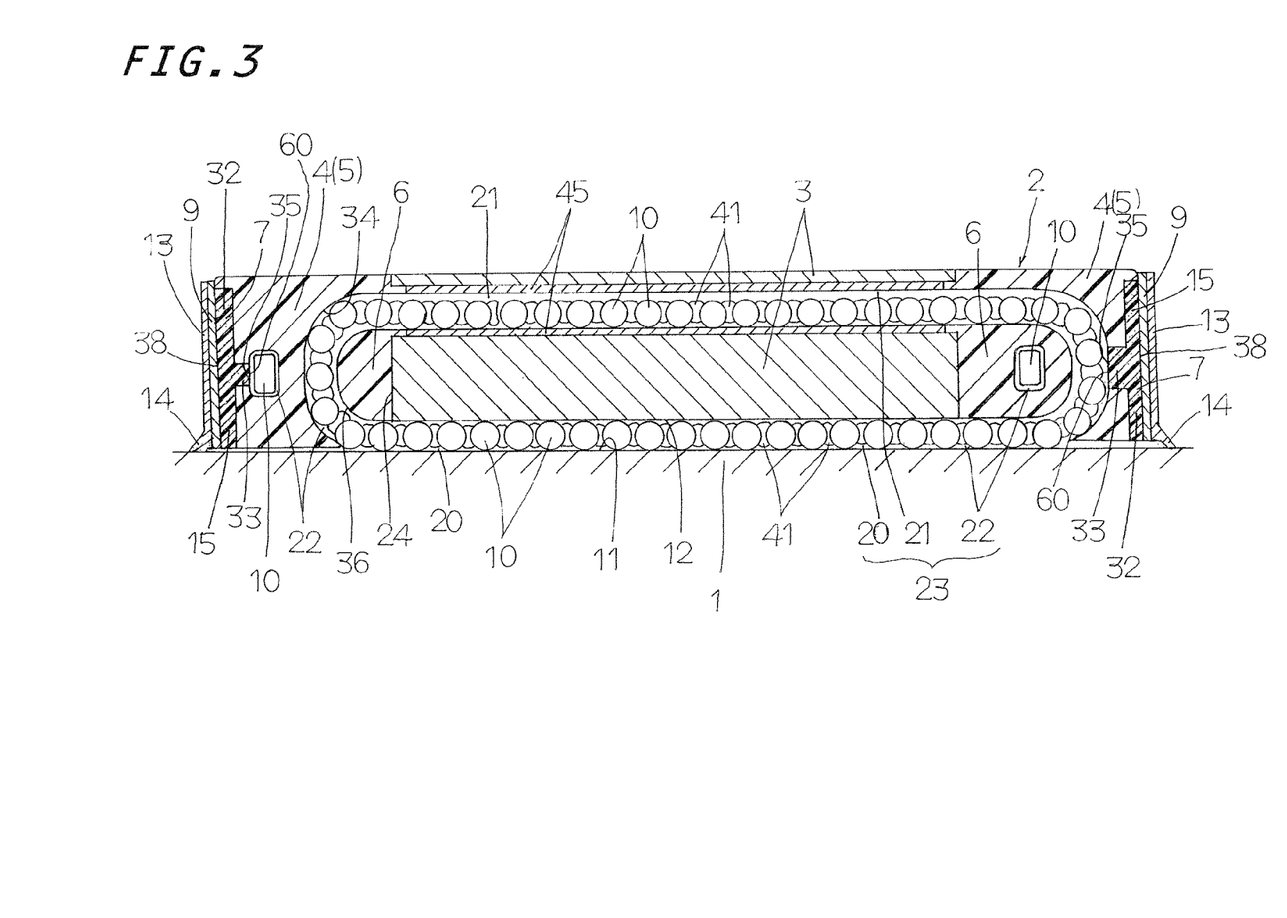
FIG. 3 is a view in longitudinal section showing a circulating circuit in the linear motion guide unit of FIG. 1, the view being taken on the planes of line III-III-III of FIG. 2.

The linear motion guide unit of the present invention, as shown in FIGS. 1 to 3, is in general composed of an elongated guide rail 1 and a slider 2 which fits over or conforms to the guide rail 1 so as to move relative to the guide rail 1 through more than one rolling element. The guide rail 1 has a hole 18 extending from a top surface 27 to a bottom surface to be used to fasten the guide rail 1 to any stationary bed including a machine bed, mounting base and so on, and first raceway grooves 11 extending lengthwise on each side of the guide rail 1. The slider 2 has second raceway grooves 12 extending in opposition to the first raceway grooves 11 on the guide rail 1 to define load-carrying races between them. With the linear motion guide unit constructed as stated just earlier, the rolling elements are rollers 10. The load-carrying races 20 defined between the raceway surfaces 11 on the guide rail 1 and the raceway surfaces 12 on the slider 2 are made two rows on each side of the guide rail 1. The rollers 10 rolling under load through the load-carrying races 20 are held in the slider 2 by means of a retainer plate 17 fastened to the slider 2 with a fastening bolt 61 which is driven into a threaded hole, not shown, in a binding strip 37 after having extended through a hole, not shown, in a carriage 3 of the slider 2.

The slider 2 is made in a flanged type and chiefly has a carriage 3, end caps 4, end seals 13, and lubricating members each of which has a lubricant reservoir plate 7 and a lubricant-containing member 8. The carriage 3 has a pair of return passages 21 extending in parallel with a pair of load-carrying races 20 defined between the raceway surfaces 11 and the raceway surfaces 12 and further has the threaded holes 19 which are used to fasten thereon counterparts, not shown, including various instruments, works, mounting parts and so on. The end caps 4 are fastened on forward and aft end surfaces 24 of the carriage 3 in the lengthwise direction of the carriage 3, one to each end surface 24, and provided therein with turnaround passages 22 extending curved to join together the load-carrying races 20 and the return passages 21. The end seals 13 are attached on outward end surfaces 26 of the end caps 4 and provided with lips 14 to close clearances left between the guide rail 1 and the slider 2. The lubricating members is impregnated with lubricant and installed in the end caps 4 to lubricate the rollers 10 which roll through circulating circuits 23 made up of the load-carrying races 20, the return passages 21 and the turnaround passages 22. The return passage 21 in the carriage 3 is defined with a lengthwise sleeve 45 which fits into a through-bore in the carriage 3. With the linear motion guide unit constructed as stated just earlier, moreover, separators 41 are interposed between any adjacent rollers 10 to make sure of smooth travel of the rollers 10.

The linear motion guide unit of the present invention is preferably applied to the large unit having the guide rail 1 of, for example 55 mm in width. The end cap 4 as shown in FIGS. 3 to 10 is composed of an end cap major body 5 and a spacer part 6 nested inside the end cap major body 5. In detail, the end cap major body 5 has an outside circular surface 34 of the turnaround passage 22 lying on to the carriage 3 and a concavity 57 made open to the carriage 3. The spacer part 6 has an inside circular surface 36 of the turnaround passage 22 lying in opposition to the outside circular surface 34 when nested inside the end cap major body 5. The end cap 4 is completed after the spacer part 6 has fit into the concavity 57 inside the end cap major body 5 so as to define the turnaround passage 22 between the end cap major body 5 and the spacer part 6.

Figure 11:
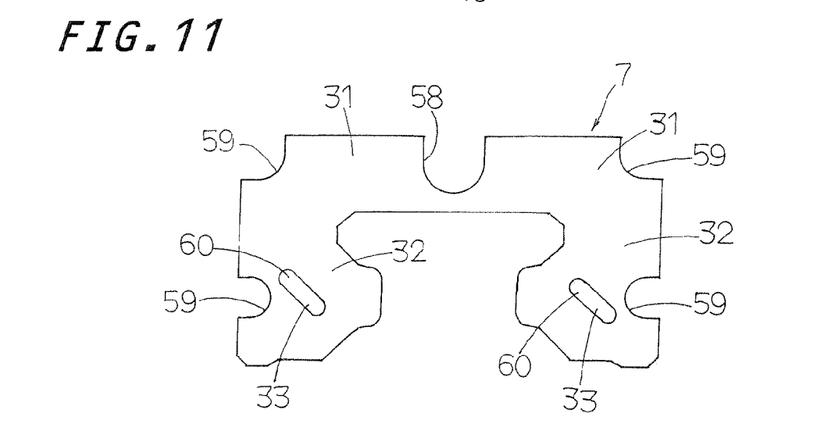
FIG. 11 is a view in rear elevation showing the lubricant reservoir plate to be combined in the linear motion guide unit, as seen from the end cap.
Figure 12:
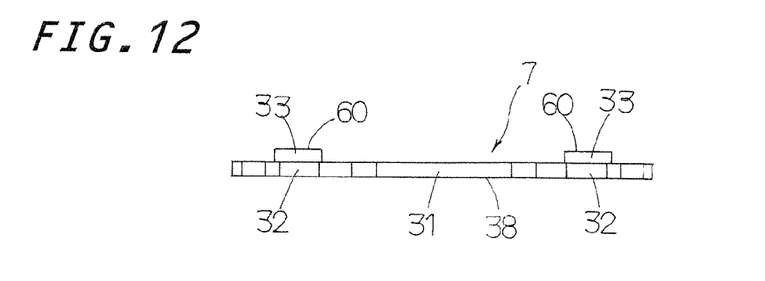
FIG. 12 is a view in bottom of the lubricant reservoir plate of FIG. 11.
Figure 13:
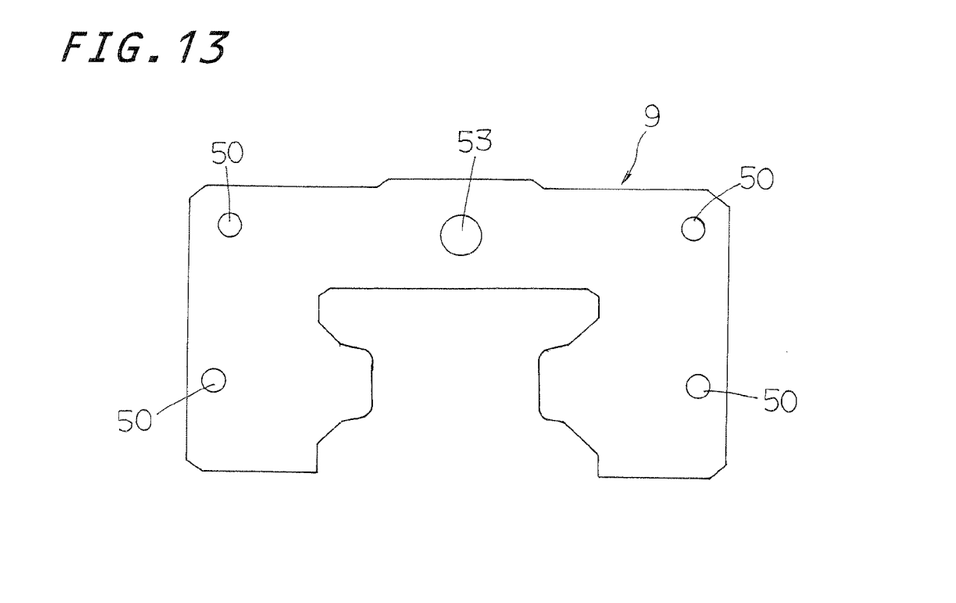
FIG. 13 is a view in front elevation showing the packing plate to be combined in the linear motion guide unit.
Figure 14:
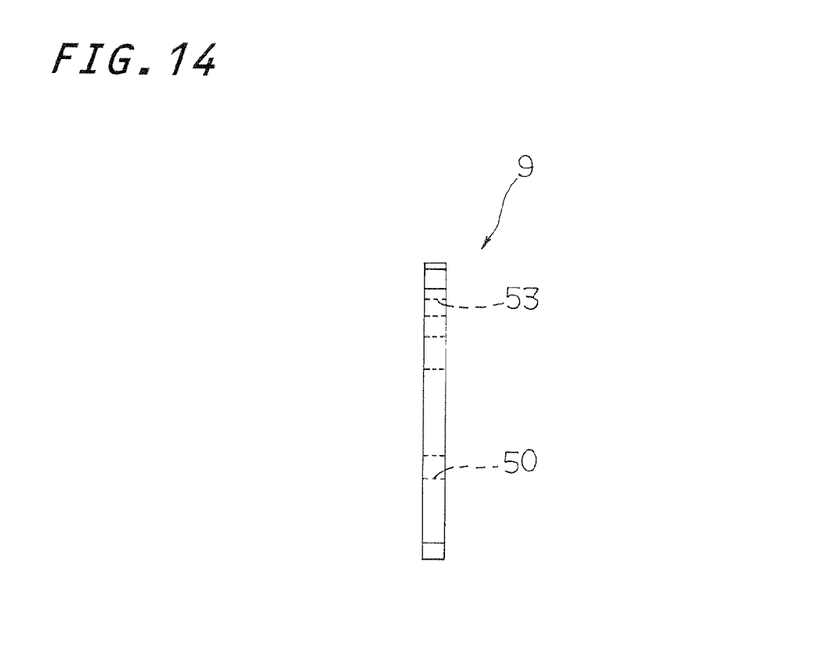
FIG. 14 is a view in side elevation of the packing plate of FIG. 13.

The end cap major body 5 has a recess 15 to receive the lubricant reservoir plate 7 on an outward surface 26 lying on the opposite side of the end cap major body 5. The lubricant reservoir plate 7 shown especially in FIGS. 11 and 12 is composed of a reservoir portion 31 to fit into the recess 15 lying in an upper middle area of the end cap major body 5, conjunctive portions 32 made integral with widthwise opposite ends of the reservoir portion 31 to fit into the recess 15 lying in sidewise bulged areas, and applicator noses 33 made integral with the conjunctive portions 32 to fit into slits 35 cut in the turnaround passages 22 in the end cap major body 5. Leading edges 60 of the applicator noses 33 are exposed to the slits 35.

Figure 8:
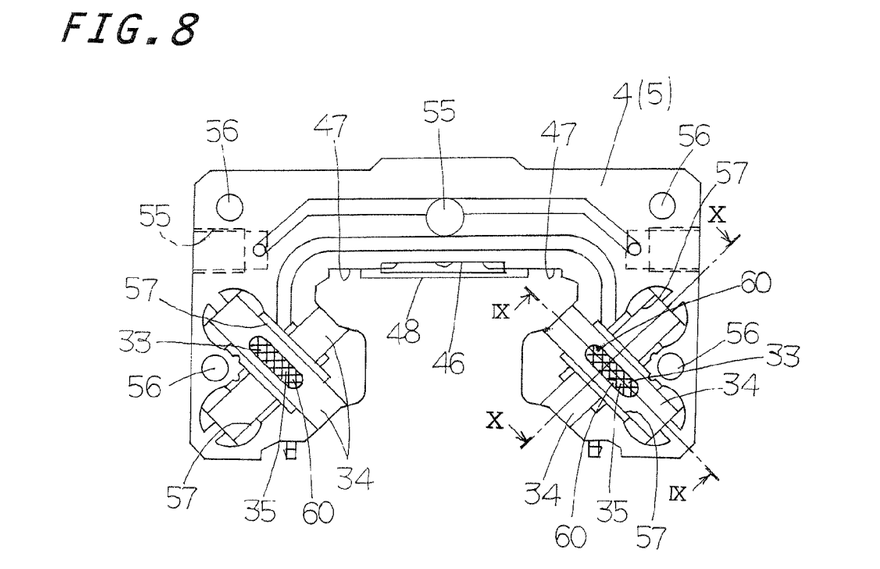
FIG. 8 is a view in rear elevation showing the end cap major body of FIG. 7, but in which a spacer part is removed from the end cap.
Figure 9:
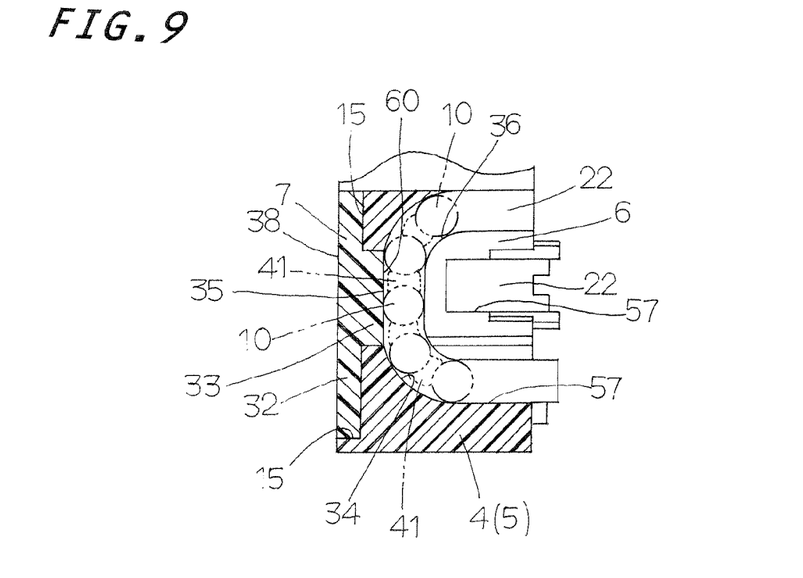
FIG. 9 is a view in section showing the end cap major body combined with the spacer part, the view being taken along the plane of line IX-IX of FIG. 8.
Figure 10:
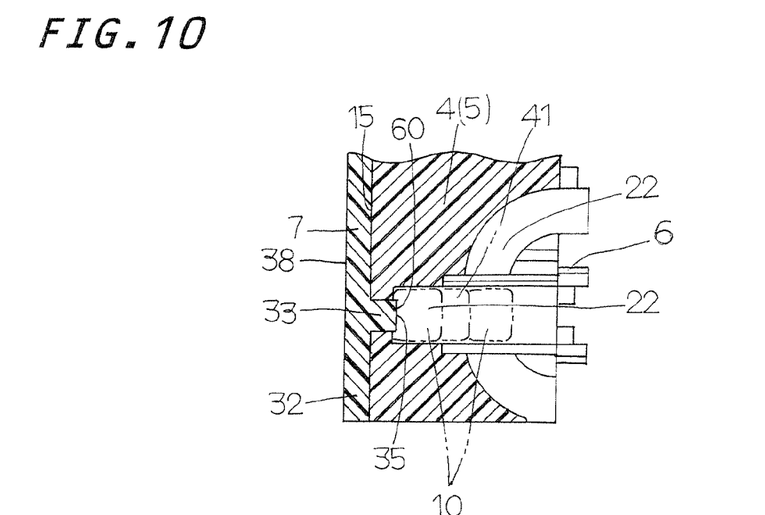
FIG. 10 is a view in section showing the end cap major body combined with the spacer part, the view being taken along the plane of line X-X of FIG. 8.

Moreover, the slider 2 as shown in FIG. 2 is provided with a lower seal 29 to close a clearance left between the lengthwise side 25 of the guide rail 1 and a bottom of the slider 2, and an inside seal 28 to close a clearance lying between the top surface 27 of the guide rail 1 and a relief recess 47 inside the concaved surface of a slider 2. As shown in FIG. 8, the inside seal 28 is held to retainer portions 48 at forward and aft ends thereof which fit into retaining holes 46 in the end caps 4. The linear motion guide unit at one of the end caps 4, moreover, has a threaded hole 55 to fit over a grease nipple, not shown, to resupply lubricant to the slider 2. More especially, the grease nipple is coupled with the threaded hole 55 on the end cap 4 after extended through a guide hole 54 in the end seal 13, a though-hole 53 in the packing plate 9 and then a U-shaped cut in the lubricant reservoir plate 7. As an alternative, the grease nipple may be coupled with a threaded hole 55 on a side surface 40 of the end cap 4.

Figure 4:
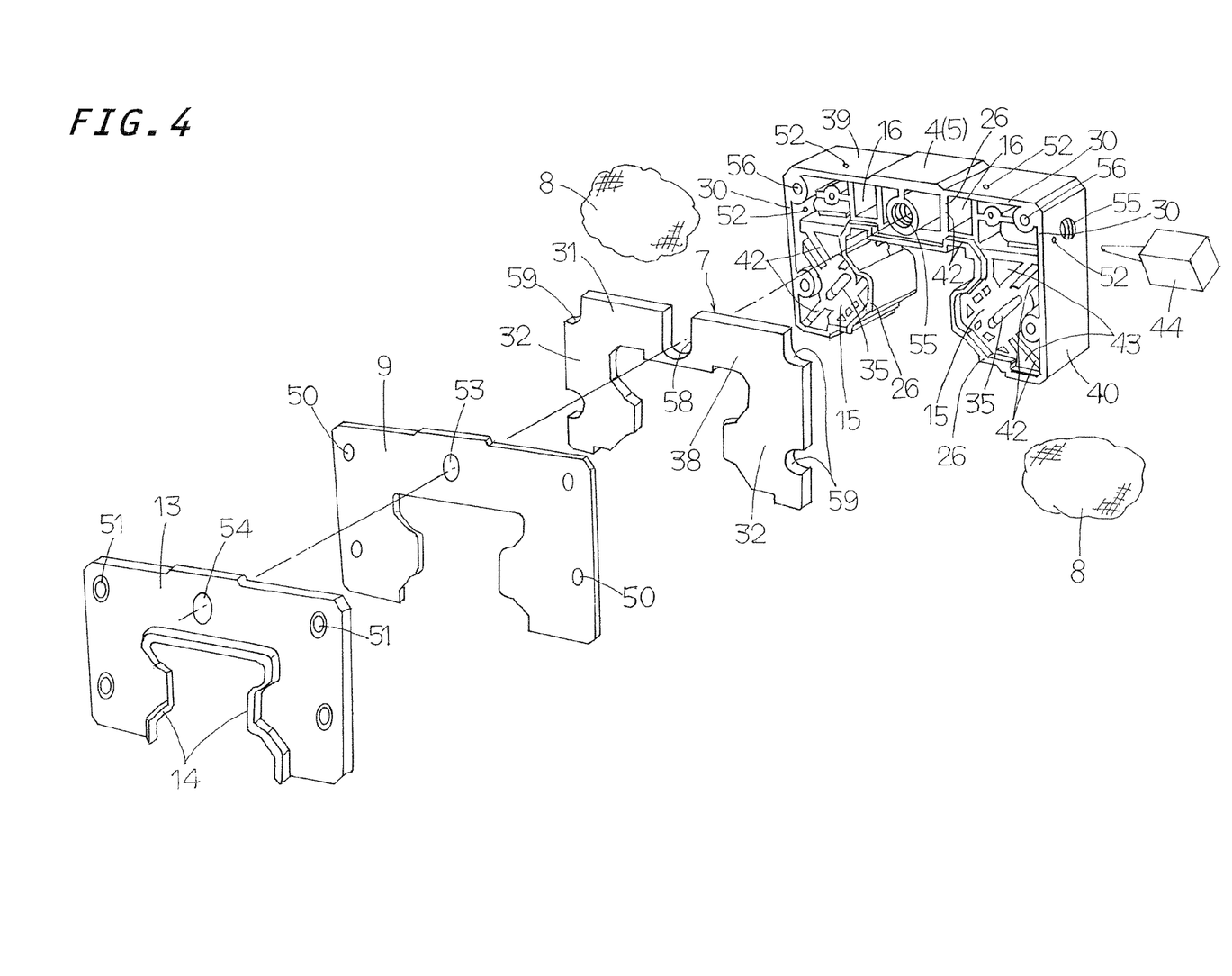
FIG. 4 is an exploded view in perspective showing an end cap, lubricant reservoir, packing plate, and an end seal in an area lying in the right-hand side in FIG. 3 in the linear motion guide unit of FIG. 1.
Figure 5:
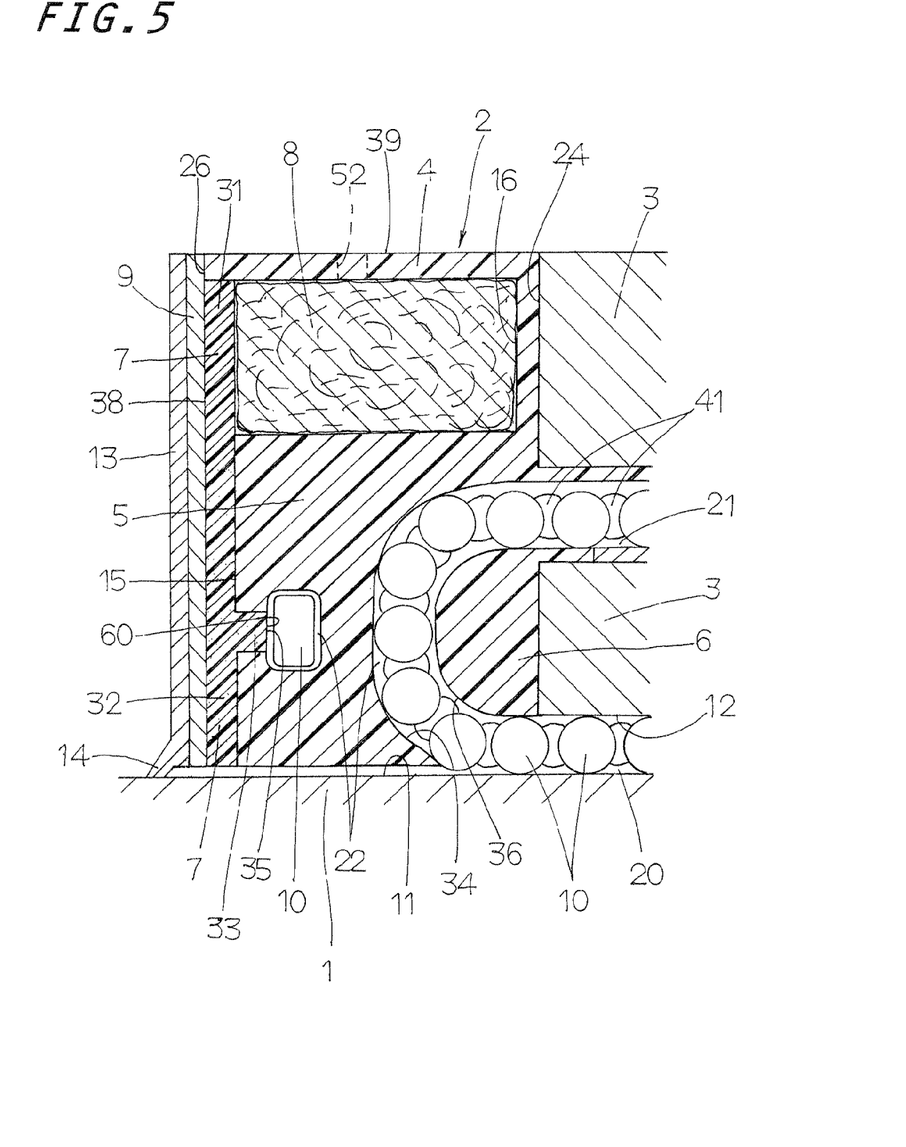
FIG. 5 is an enlarged fragmentary view in transverse section as with FIG. 2 to show an area lying in the left-hand side in FIG. 3 in the linear motion guide unit of FIG. 1.
Figure 6:
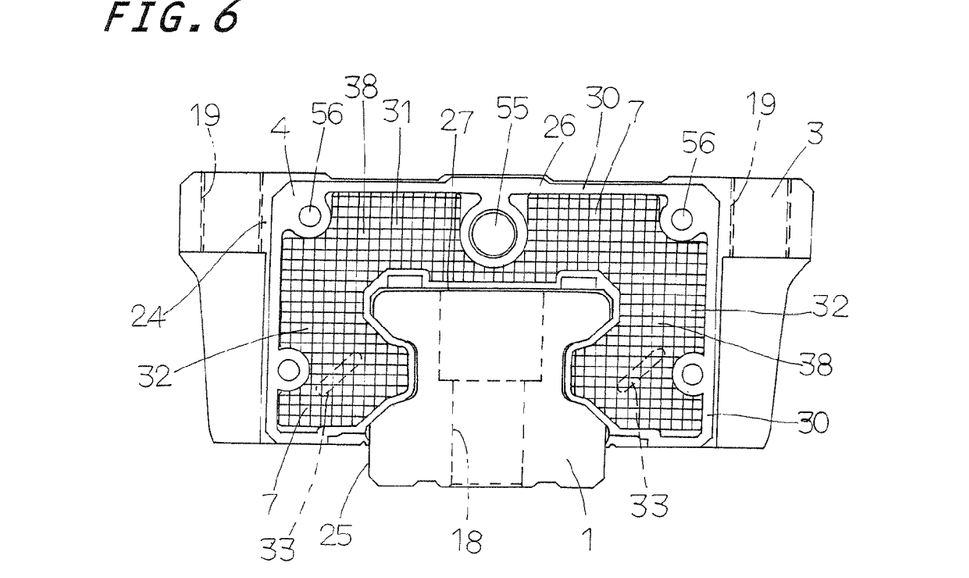
FIG. 6 is a view in front elevation of the linear motion guide unit, but in which the end seal shown in FIG. 4 is removed.
Figure 7:
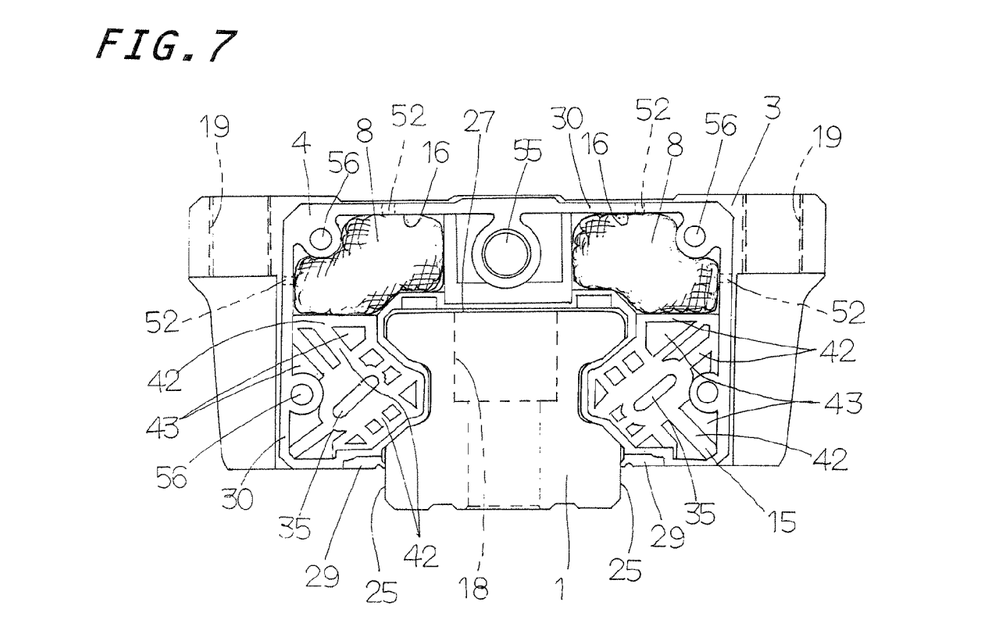
FIG. 7 is a view in front elevation to show an end surface of the end cap of FIG. 4.

With the linear motion guide unit constructed as stated earlier, the lubricating member impregnated with lubricant as shown in FIGS. 4, 5 and 7 is composed of the lubricant reservoir plate 7 and the lubricant-containing member 8. More especially, the lubricant reservoir plate 7 impregnated with lubricant fits in the recess 15 formed on the outward end surface 26 of the end cap major body 5. The lubricant-containing member 8 is stowed in an inside space 16 lying deeper than the recess 15, and kept in close contact with the lubricant reservoir plate 7 to resupply lubricant into the lubricant reservoir plate 7. Referring to FIGS. 4 and 5 in greater details, the linear motion guide unit of the present invention has the packing member 9, which is interposed between the lubricant reservoir plate 7 and the end seal 13 to make close contact with an edge 30 defining the recess 15, thereby covering the whole area of an outward surface 38 of the lubricant reservoir plate 7 to seal hermetically the lubricant in the end cap 4.

The lubricant-containing member 8 is stowed into spaces 43 defined with reinforcing ribs 42 and further into rooms 16 made with the reinforcing ribs 42. With the version discussed here, it is preferred that the rooms 16 are intercommunicated with each other to allow the lubricant to move through between the rooms 16. The lubricant-containing member 8 is made of fibrous material such as nonwoven cloth, felt, cotton and so on which has pores or cells open each other through interstices or channels adapted to absorb or preserve lubricant therein. With the linear motion guide unit of the present invention, the spaces 43 defined with the reinforcing ribs 42 are filled awash with the lubricant-containing member 8. The end cap 4 on an upper surface and/or side surfaces 40 thereof has oiling holes 52 open to the lubricant-containing member 8 to resupply lubricant to the lubricant-containing member 8 through the oiling holes 52. Then, the lubricant moves from the lubricant-containing member 8 into the lubricant reservoir plate 7 for the application of lubricant around the rollers 10. The lubricant-containing member 8 is packed into the spaces 43 and the compartments 16 in the end cap major body 5, with divided into a plurality of blocks. Lubricant resupplied in the lubricant-containing member 8, though being absorbed and impregnated in the lubricant-containing member 8, leaks less outside the end cap 4 through the oiling holes 52 because the oiling holes 52 are made very small in light of the surface tension and viscosity of lubricant. The oiling holes 52 made in the end cap 4 at times are closed with plugs or adhesive sheet to keep lubricant against escaping out of end cap 4 through the oiling holes 52.

In assembly of the end cap 4, portions of the lubricant-containing member 8 are placed in the spaces 43 and the rooms 16 in the end cap major body 5. Then, the lubricant reservoir plate 7 is installed in the recess 15 surrounded with the edge 30 and the spacer part 6 is set in the concavity 57 of the end cap major body 5. With assembly of the slider 2, moreover, the end caps 4 are disposed on forward and aft end surfaces 24 of the carriage 3 in the lengthwise direction of the carriage 3, one to each end surface 24. Thereafter, the packing plate 9 is brought into abutment against the edge 30 of the outward surface 26 of the end cap major body 5 to cover entirely the whole area of the lubricant reservoir plate 7. The end seal 13 has been last placed on an end surface of the packing plate 9. Then, a fastening bolt 49, refer to FIG. 1, after extending through a bolt hole 51 in the end seal 13, bolt hole 50 in the packing plate 9, U-shaped cut 59 in the lubricant reservoir plate 7 and the bolt hole 56 in the end cap major body 5 is driven into a threaded hole, not shown, in the carriage 3 to squeeze the end cap 4, packing plate 9 and the end seal 13 against the carriage 3, whereby the packing plate 9 covers the overall area of the lubricant reservoir plate 7 to keep the lubricant reservoir plate 7 in hermetically tight state. It will be thus understood that the edge 30 of the reinforcing ribs 42 spreads over the entire circumference of the end cap major body 5 so that the pacing packing plate 9 is brought into abutment and fixture against the edge 30 of the end cap major body 5 and therefore the packing plate 9 seals the recess 15 in the end cap major body 5. As a result, lubricant is kept against leakage around the packing plate 9.

Moreover, the lubricant reservoir plate 7 is made of porous compact whose pores or cells are preserved to open each other through interstices or channels and impregnated with lubricant. The porous compact is made of a finely powdery ultra-high molecular weight synthetic resin of, for example, polyethylene or polypropylene. More especially, after the finely powdery synthetic resin is compacted under pressure together with the application of heat, the resulting resinous member comes to have open-porous texture in which pores are open to each other through interstices among synthetic resinous particles. With the linear motion guide unit of the present invention, the outward surface 38 of the lubricant reservoir plate 7 is hermetically sealed with the packing plate 9. Thus, as the lubricant soaked in the pores or cells of the porous compact of the lubricant reservoir plate 7 is consumed, the lubricant previously held inside the lubricant-containing member 8 may move into the lubricant reservoir plate 7 with the capillary action to continue keeping the lubricant reservoir plate 7 in a condition constantly impregnated with lubricant for better lubrication around the rollers 10. Moreover, as the lubricant-containing member 8 is less than the lubricant reservoir plate 7 in absorption rate or retaining power of lubricant, the lubricant previously held in the lubricant-containing member 8 is allows moving smoothly with capillary action to the lubricant reservoir plate 7 without causing backward flow into the lubricant-containing member 8.

What is claimed is:

1. A linear motion guide unit comprising:
   an elongated guide rail having widthwise opposed sides, each widthwise opposed side having a first raceway surface extending lengthwise of the guide rail, and a slider that fits over or conforms to the elongated guide rail for movement lengthwise of the guide rail through more than one rolling element,
   the slider including a carriage, end caps, end seals, rolling elements and a lubricating member,
   the carriage having a second raceway surface extending in opposition to the first raceway surface on the guide rail to define a load-carrying race between the first raceway surface and the second raceway surface and a return passage extending in parallel with the load-carrying race,
   the end caps being fastened on forward and aft end surfaces of the carriage, one end cap to each end surface, and
   the end caps being provided with turnaround passages to join together the load-carrying race and the return passage,
   the end seals being attached on outward end surfaces of the end caps,
   a circulating circuit which the rolling elements roll comprising the load-carrying race, the return passage and the turnaround passages, and
   the lubricating member being impregnated with lubricant and installed in one of the end caps to lubricate the rolling elements; and
   wherein the lubricating member is composed of a lubricant reservoir plate and a lubricant-containing member, the lubricant reservoir plate being impregnated with the lubricant to lubricate the rolling elements, and
   the lubricant reservoir plate being installed in a recess lying on an outward end surface of the end cap, and
   the lubricant-containing member being stowed in an inside space lying deeper than the recess, and
   the lubricant-containing member being kept in close contact with the lubricant reservoir plate to resupply the lubricant to the lubricant reservoir plate with the lubricant.

2. The linear motion guide unit constructed as defined in claim 1, further comprising a packing plate placed between the lubricant reservoir plate and the lubricant-containing member in close engagement with an edge defining the recess on the end cap to entirely cover the lubricant reservoir plate to seal the lubricant impregnated in the lubricant reservoir plate inside the end cap.

3. The linear motion guide unit constructed as defined in claim 1, wherein the lubricant reservoir plate is a porous compact, the porous compact having a shape that is preserved by pores or cells interconnected with each other and impregnated with the lubricant.

4. The linear motion guide unit constructed as defined in claim 3, wherein the porous compact is made of a finely powdery synthetic resinous particles formed from a ultrahigh molecular weight synthetic resin of polyethylene or polypropylene and has the pores or cells which are open to each other through interstices among the synthetic resinous particles after the finely powdery synthetic resin has been compacted under pressure together with application of heat.

5. The linear motion guide unit constructed as defined in claim 1, wherein as the lubricant soaked in pores or cells of the porous compact of the lubricant reservoir plate is consumed, the lubricant held inside the lubricant-containing member moves into the lubricant reservoir plate with capillary action.

6. The linear motion guide unit constructed as defined in claim 5, wherein the lubricant-containing member has an absorption rate of lubricant that is less than an absorption rate of the lubricant reservoir plate, so that the lubricant held in the lubricant-containing member is allowed moving to the lubricant reservoir plate.

7. The linear motion guide unit constructed as defined in claim 1, wherein the lubricant reservoir plate comprises:
   a reservoir portion that fits into the recess lying in an upper middle area of an end cap major body,
   conjunctive portions integral with widthwise opposite ends of the reservoir portion to fit into sidewise bulged areas, and
   applicator noses integral with the conjunctive portions to fit into slits cut in the turnaround passages in the end cap major body to expose tips of the applicator noses to the turnaround passages.

8. The linear motion guide unit constructed as defined in claim 1, wherein the lubricant-containing member is stowed into compartments defined with reinforcing ribs in the end cap and further wherein the end cap on an upper surface and/or side surfaces thereof has oiling holes open to the lubricant-containing member to resupply the lubricant to the lubricant-containing member through the oiling holes whereby the lubricant is allowed to move from the lubricant-containing member to the lubricant reservoir plate for application of the lubricant around the rolling element.

9. The linear motion guide unit constructed as defined in claim 1, wherein the lubricant-containing member is made of lubricant sustainable material of fibrous material including nonwoven cloth, felt, and cotton.

10. The linear motion guide unit constructed as defined in claim 1, wherein the lubricant-containing member is packed as much as possible into a space in the end cap, and the lubricant-containing member is divided by reinforcing ribs into a plurality of compartments.

* * * * *